United States Patent Office 3,039,645
Patented June 19, 1962

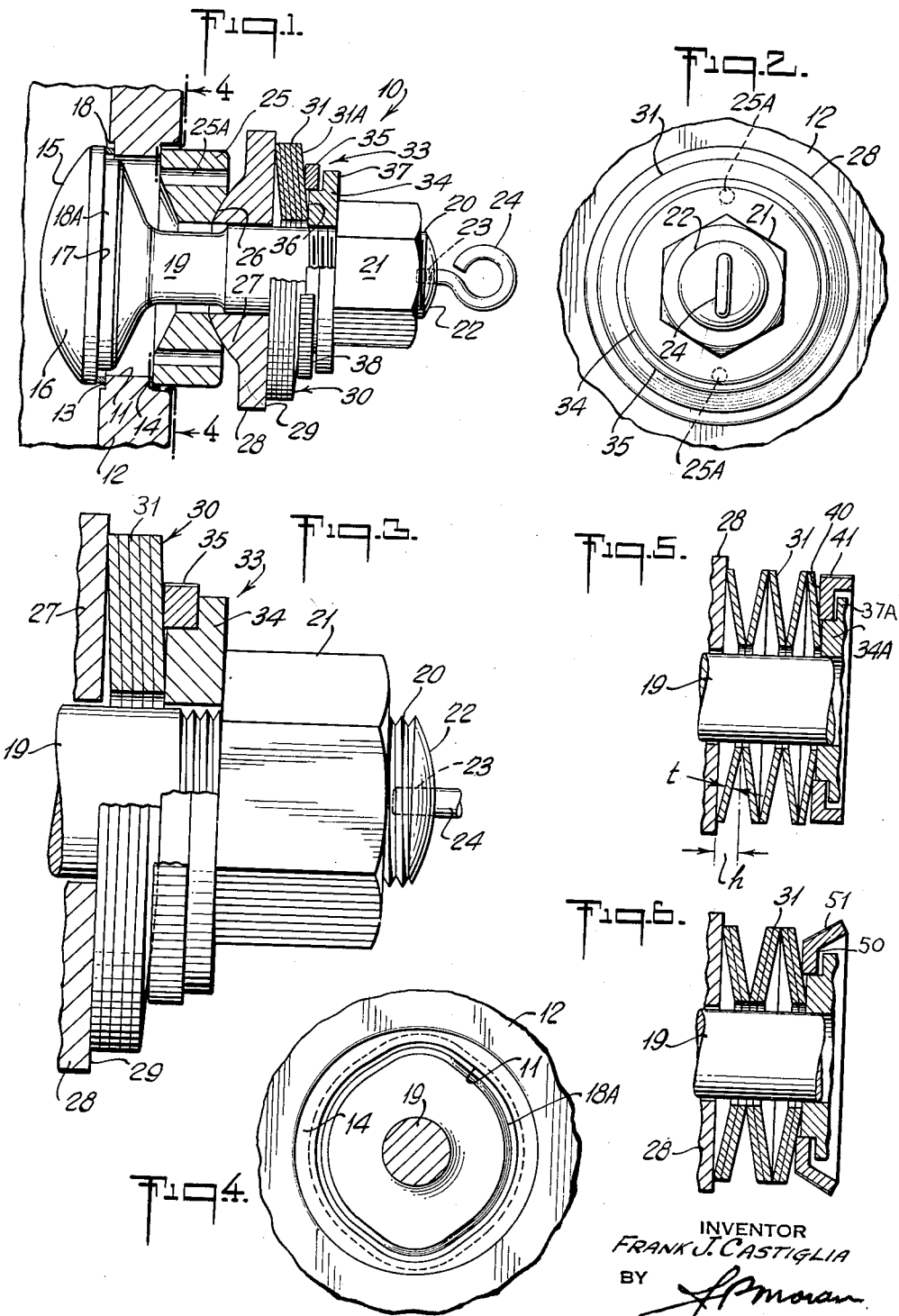

3,039,645
PRESSURE VESSEL CLOSURE
Frank J. Castiglia, Harrison, N.Y., assignor to The Babcock & Wilcox Company, New York, N.Y., a corporation of New Jersey
Filed Aug. 29, 1960, Ser. No. 52,473
13 Claims. (Cl. 220—25)

This invention relates to a pressure vessel closure, and more specifically to an improved spring loaded closure or handhole fitting for sealing fluid tight an access opening or the like extending through the wall of a pressure vessel.

Pressure vessels of various types, such as steam or vapor drums and headers employed in steam generators and the like, are generally provided with handholes or other openings for access to tube connection and internal components. These access openings are arranged to be tightly sealed by fittings which comprise generally a closure or head associated with a suitable gasket adapted to engage a seating surface extending about the periphery of the opening on its one side, a binder imposed in substantial alignment with the closure to engage a seating surface on the other side of the opening, and a connected threaded stem with mating nut to draw the closure and binder into sealing position with respect to the opening.

Heretofore, problems of leakage and/or gasket damage have been encountered with such closures. It has been observed that such leakage and gasket damage resulted from overstressing of the gasket either by an excessive application of the force necessary to initially draw the parts into sealing relationship and/or by the adverse effect of pressure cycling inherent in the operation of a boiler.

Prior to this invention, initial sealing of the known handhole closures had been attained simply by the turning of the nut down onto the threaded stem to draw the closure and binder together until a desired degree of tightness or sealing force was obtained. However, the amount of force so exerted was uncontrolled and therefore rendered uncertain. With the known fittings the actual amount of pressure or force applied to the nut and transmitted to the closure to initially make a fluid tight seal was entirely dependent on the experience or inexperience of the maintenance personnel or operator involved. Thus too little force resulted in an ineffective seal and too much force overly stressed the gasket. Due to the inability of even a reasonably competent operator to accurately judge the force necessary for attaining the requisite degree of tightness frequently resulted in leakage and/or gasket damage. Furthermore it was virtually impossible with the prior known constructions to transmit the initial sealing load uniformly to the gasket. Consequently the resulting non-uniform loading of the gasket further aggravated the problem of leakage and/or damage to the gasket.

The tightness of such fittings is also adversely affected by the action of pressure cycling inherent in boiler operation. Pressure cycling occurs each time a boiler is put on the line and brought up to pressure, and then taken off the line. Since initial tightening to make the seal is obtained, when there is no load on the boiler, by rotation of the nut onto the threaded stem to draw the parts together, there is created in the stem of the fitting a tensile stress that sealingly seats the gasket and closure. Consequently, subsequent application of a load on the boiler places an additional compressive force on the gasket. This additional force in turn tends to reduce to some extent the tensile stress created in the stem. Upon removal of the boiler load, the parts of the fitting normally tend to assume their original initial sealed position. However, since no gasket material is truly resilient, the closure components will not completely return to their original position upon the removal of the boiler load. Therefore, the initial tensile stress in the stem of the fitting is somewhat relieved. This in turn relieves to some extent the force that is initially applied by the nut to sealingly seat the gasket. Therefore to recover this loss and to restore the requisite amount of force to insure initial sealing necessitated retightening of the nut. This remedy only served to increase and aggravate the risk of damage to the gasket.

An object of this invention is to provide an improved closure fitting to which a predetermined optimum sealing force is resiliently transmitted in a manner so as to prevent initial overloading of the sealing surface and to maintain the seal in firm, fluid-tight relationship despite deformation of the sealing surface which would otherwise tend to diminish the sealing force initially imposed thereon.

Another object is to provide a closure fitting in which the optimum amount of sealing force necessary to initially effect a fluid-tight seal can be determined with certainty and accuracy.

Another object is to provide an improved closure fitting in which the initial sealing force is uniformly transmitted and distributed onto the sealing surfaces.

The foregoing objects and other features and advantages of this invention are attained by a closure fitting comprising essentially of a head or closure and associated gasket adapted to engage the peripheral portions of a pressure vessel opening on one side, a stem connected to the closure and extended through the opening, a binder disposed on the stem and adapted to engage the other side of the opening, and a nut threaded onto the stem to draw the parts into sealing relationship upon tightening of the nut. A spherical bearing washer may be disposed on the stem in co-operating interrelationship with the binder to effect sealing adjustment of the binder and closure despite irregularities in their seating surfaces.

The improvement according to this invention resides in the positioning of a resilient means, as for example, one or more conical or Belleville type springs on the stem of the fitting between the point upon which the sealing force is applied, i.e. the nut, and the point to which the force is transmitted, i.e. the head or closure, to enhance uniform transmission and distribution of a predetermined initial sealing load to the gasket and to maintain the closure in firm fluid-tight relationship despite gasket deformation. In order that it may be determined with certainty and accuracy when a predetermined optimum load necessary to form a fluid-tight seal has been reached without overly stressing the gasket, a safety stop means is disposed about the stem in co-operative relationship with the resilient spring means. The safety stop means comprises essentially a flanged collar and co-operating stop ring proportioned so that the stop ring is free to rotate by hand until the Belleville springs are properly loaded by a given force. Upon tightening of the nut to load the springs, the clearance provided between the flanged collar and the stop ring, which permits the free rotation of the stop ring, is progressively diminished as the springs approach the desired load condition. Indication that the optimum sealing load has been placed on the gasket is had when the stop ring becomes wedged so that hand rotation of the ring is prohibited.

A feature of this invention resides in the provision of interposing about the stem of the fitting a resilient means arranged and constructed so as to resist any tendency of gasket deformation to mitigate the requisite amount of force applied by the nut necessary to maintain the initial sealing relationship of the fitting.

Another feature resides in the provision of a safety stop ring for appraising even the most inexperienced operator when the requisite amount of initial sealing force has been applied to form a fluid-tight seal without overly stressing the gasket.

Another feature resides in the flexibility of arrangement afforded by the use of conical springs to satisfy any given condition.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

In the drawings:

FIG. 1 is a diametrical sectional view taken through a handhole illustrating a closure fitting therefor with portions thereof shown in section. The fitting is shown in its unstressed position.

FIG. 2 is a right end view of the FIG. 1.

FIG. 3 is an enlarged fragmentary sectional view of FIG. 1, illustrating the parts stressed in their initial sealing position.

FIG. 4 is a view taken along line 4—4 on FIG. 1.

FIG. 5 is a fragmentary view of a modified form of the invention illustrating the spring means in accordance with this invention staked in series.

FIG. 6 is another fragmentary embodiment of the invention illustrating the spring means stacked in a parallel-series combination.

Referring to the drawings, there is illustrated a closure or fitting 10 for sealing a substantially elliptical handhole or access opening 11 formed in the wall of a suitable pressure vessel 12 such as, for example, a steam or vapor drum or header usable in a steam generator. Around the periphery on each side of the handhole 11 the wall of the vessel is formed with seating surfaces 13 and 14. These seating surfaces 13 and 14 are ground, milled or otherwise finished so as to be smooth and parallel to one another. The handhole closure 10 includes a substantially elliptical cover or head 15 having a spherical or curvilinear surface portion 16. The minor diameter of the cover or head 15 is slightly less than the major diameter of the handhole 11 so that the head may be inserted through the handhole and then properly oriented relative thereto. The peripheral margin 17 about the outer periphery of the head is finished flat to engage a suitable gasket 18 adapted to seat against surface 13, and margin 17 surrounds a boss 18A which emerges into a threaded stem 19 arranged to extend outwardly through the hole or opening 11. The stem 19 is externally threaded at 20 to receive a nut 21.

In the outer end 22 of the stem 19 there is provided a centrally located tapped hole 23 adapted to receive an eye bolt 24 to which a line is attached to prevent the closure 10 from dropping into the vessel 12 during a maintenance or repair operation.

A binder or archbar 25 is arranged to receive the stem 19 and to seat on the outer surface 14 of the opening 11 so that upon tightening of the nut 21 the cover 15 is drawn firmly against the gasket seating on surface 13. As shown, the outer surface of the binder is provided with a centrally disposed recess 26 having a spherical surface. This recess 26 is arranged to co-operate with a washer 27 having a spherical convex surface with a laterally extending flange 28 and an outer flat surface 29. The spherical surfaces of the binder 25 and washer 27 co-operate to adjust for seating irregularities as the nut is tightened to draw the parts together. Opposed apertures 25A are provided in the binder or archbar 25 to function as vents.

In accordance with this invention, a resilient means 30 is disposed about the stem 19 for resiliently loading a handhole gasket 18 with a predetermined optimum initial sealing force. With the trend toward higher pressure and temperatures, as in the art of steam generation, such optimum initial sealing loads may reach as high as 5,000 lbs. or more. Because of the need of such high initial loading and because of the relatively small space in which this must be performed, conical or belleville springs 31 are provided for resiliently transmitting the load applied at the nut 21 to the gasket 18.

It is to be observed that these springs 31 may be used singly or in numbers. As shown in FIGS. 1 and 3, several conical springs 31 are stacked about the stem 19 between the nut 21 and the spherical washer 27. In FIGS. 1 and 3 the several conical springs are shown stacked in parallel so that preferably the base of the lower- or inner-most spring is seated on the extended flange 28 of the spherical washer 27. When these conical springs 31 are stacked in parallel, as in FIGS. 1 and 3, the load for any given deflection is increased in proportion to the number of springs employed. Thus the optimum load desired to be imposed can be controlled for any given condition by proper selection spring size and number.

If desired the several conical springs 31 may be stacked in series, as shown in FIG. 5, in which case the deflection for a given load is increased in proportion to the number of springs used. Thus, depending on a particular design condition to be satisfied either stacking arrangement, i.e. either series or parallel stacking may be employed to meet a particular condition; or any combination of both series/parallel stacking of conical springs 31 may be employed, as shown in FIG. 6. In the latter situation both the load and deflection can be proportioned or controlled to meet desired design conditions. Because of the flexibility afforded by the various combinations and arrangements of such conical springs, the selection of the optimum working characteristics for loading a handhole gasket of any given construction is greatly enhanced.

Another advantage which has been noted in the application of conical springs in accordance with this invention, is that by maintaining the relationship of $h$ to $t$ equal to approximately 1.5, see FIG. 5, where $h$ is the maximum deflection and $t$ is the thickness of the spring, a constant load spring can be approached, i.e. a spring maintaining constant load over a wide range of deflection. Thus, in accordance with this invention, in order to achieve a given load, it is not necessary that the springs be completely flattened. In fact, a flattened spring position should be avoided. This is because the conical spring 31, if loaded to its flattened state, would then function as a common, flat washer. In this state, the advantages of spring action would be lost. Also the conical springs when flattened can be easily overloaded and thus result in overstressing of the gasket to cause eventual failure thereof.

An important aspect of this invention resides in the inclusion of a safety stop means 33 which functions as an indicating means to appraise an operator when the requisite amount of force has been transmitted to the gasket 18 so as to insure an initial fluid-tight seal without overly stressing the gasket. As shown, the stop means 33 comprises a flanged collar 34 and co-operating stop ring 35 which is positioned on the stem 19 between the nut 21 and the uppermost conical spring 31A. As shown, the collar 34 is provided with a boss 36 which is adapted to engage the uppermost spring 31A. Disposed about the boss 36 of the collar 34 in a recess formed between the uppermost spring 31A, and the flange 37 of collar 34, is the safety stop ring 35.

It will be observed that in the unstressed position, as seen in FIG. 1, a clearance 38 is provided between the flange 37 of the collar 34 and the safety stop ring 35. In this unstressed position the stop ring 35 is rendered freely rotatable by hand about the boss 36.

The operation of the safety stop means 33 is such that upon tightening of the nut 21, the clearance 38 between the flanged collar 34 and the stop ring 35 is progressively diminished as the springs 31 approach the desired loaded condition. When this condition has been reached, the safety stop ring 35 will become wedged between the flange collar 34 and the depressed conical springs 31, as seen in FIG. 3, so that hand rotation of the stop ring 35 is prohibited. When this occurs, the operator will then be appraised that he has tightened the nut 21 with a requisite amount of force sufficient to urge the gasket 18 into initial fluid-tight sealing position without having reached the flattened position of the springs 31. Consequently, the employment of conical springs 31 in co-operation with the safety stop ring 35 and collar 34 insures that the initial optimum load required to form a fluid-tight seal is attained in a regular, positive, uniform and ascertainable manner. Consequently, it will be apparent that the requisite amount of force necessary to form a proper initial fluid-tight seal can be properly made by even a relatively unskilled operator.

As shown in FIG. 5, the stop ring 40 is illustrated in a slightly modified form. In this form the stop ring 40 is provided with a peripheral skirt 41 which circumscribes the flange 37A of collar 34A. If desired, the peripheral surface of the ring skirt 41 may be knurled, the purpose of the knurling and skirt 41 is to facilitate the operator's grasping of the ring when testing to see if the ring 40 can be rotated after the fitting has been initially loaded.

In FIG. 6, the stop ring 50 is illustrated in still another modified form. In this form the ring 50 is provided with an angularly disposed flange 51.

Use of the conical springs 31 in accordance with this invention also insures that the load applied at the nut is uniformly transmitted and distributed about the periphery of the gasket 18. In addition, the springs maintain the controlled forces on the seal or gasket 18, regardless of pressure variations. This is due to the ability of springs 31 to absorb the movement resulting from the additional force of boiler pressure. When the boiler pressure is reduced, the spring assembly 31 will continue to maintain the controlled pressure on the gasket 18, and hold the parts in firm, fluid-tight, sealing relationship, despite gasket deformation.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A fitting, for use as a closure for an opening in a pressure vessel, comprising a sealing means adapted to sealingly seat against the peripheral edge of the opening on one side thereof, a stem connected to said sealing means and extended through said opening when said sealing means is seated against the opening, a binder adapted to seat against a peripheral edge of said opening on the other side thereof, said binder having an aperture through which said stem projects when said binder is in engagement with the other side of the opening, a nut threaded onto said stem to draw said sealing means into sealing relationship to said opening, spring means disposed on said stem to transmit and distribute an initial predetermined sealing force to said sealing means upon tightening of said nut whereby said spring means also compensates for deformation of said sealing means due to overstressing to insure the maintenance of said initial sealing force on said sealing means upon the removal of working pressure acting on said sealing means, and stop means mounted on said stem to determine when said initial seal loading of the sealing means is reached.

2. A fitting, for use as a closure for an opening in a pressure vessel, comprising a sealing means adapted to sealingly seat against the peripheral edge of the opening on one side thereof, a stem connected to said sealing means and extended through said opening when said sealing means is seated against the opening, a binder adapted to seat against a peripheral edge of said opening on the other side thereof, said binder having an aperture through which said stem projects when said binder is in engagement with the other side of the opening, a nut threaded onto said stem to draw said sealing means into sealing relationship to said opening, spring means disposed on said stem to transmit and distribute an initial predetermined sealing force to said sealing means upon tightening of said nut whereby said spring means compensates for deformation of said sealing means due to overstressing so as to maintain said initial sealing force on said sealing means upon the removal of working pressure acting on said sealing means, and a stop means for determining when said initial seal loading is reached, said stop means including a collar having a laterally extending flange, and a co-operating stop ring in alignment with said flange, said collar and ring being disposed on said stem below said nut, so that the stop ring is free normally to be rotatable about said stem until said predetermined sealing load is reached.

3. A fitting, for use as a closure for an opening in a pressure vessel, comprising a sealing means adapted to sealingly seat against the peripheral edge of the opening on one side thereof, a stem connected to said sealing means and extended through said opening when said sealing means is seated against the opening, a binder adapted to seat against a peripheral edge of said opening on the other side thereof, said binder having an aperture through which said stem projects when said binder is in engagement with the other side of the opening, a nut threaded onto said stem to draw said sealing means into sealing relationship to said opening, a plurality of stacked conical springs disposed on said stem to transmit and distribute to said sealing means an initial predetermined sealing force imposed by the tightening of said nut whereby said stacked springs also compensate for deformation of said sealing means due to overstressing thereof for assuring maintenance of said initial sealing force on said sealing means upon the removal of working pressure acting thereon and a stop means disposed between said nut and said springs to determine when said initial loading of the sealing means is reached.

4. The invention as defined in claim 3, wherein said conical springs are stacked in parallel.

5. The invention as defined in claim 3, wherein said conical springs are stacked in series.

6. The invention as defined in claim 3, wherein said conical springs are stacked in parallel-series combination.

7. The invention as defined in claim 3, wherein said stop means includes a collar disposed on said stem to engage said springs, said collar having a laterally extending flange, a co-operating stop ring disposed on said stem between said springs and said collar in axial alignment with said flange, said ring and flange normally having a clearance therebetween so as to render said stop ring freely rotatable about said stem so that the turning of said nut for applying said initial sealing pressure progressively diminished said clearance to wedge said stop ring against rotation as the initial sealing pressure is approached.

8. A fitting, for use as a closure for an opening in a pressure vessel, comprising a head having an associated gasket means adapted to sealingly seat against the peripheral edge of the opening on the inner end thereof, a stem centrally connected to said head and extended outwardly through said opening when said head and associated gasket means are seated against the opening, a binder adapted to seat against the peripheral edge of said opening on the outer side thereof, said binder having a central aperture through which said stem projects when said binder is in engagement with the outer end of the opening, a washer seated against said binder, said binder and washer having adjacent co-operating curvilinear surfaces to provide sealing adjustment of the head and binder in the event of seating irregularities, a nut threaded onto said stem to draw said head and associated gasket means into sealing relationship with the inner peripheral edge of said opening, and means disposed between said nut and washer to uniformly transmit and distribute to said head and gasket means an initial predetermined sealing force upon tightening of said nut, and whereby said latter means also compensates for deformation of said gasket means due to overstressing to assure maintenance of said initial sealing force on said gasket means upon the removal of an applied pressure to said head.

9. A fitting, for use as a closure for an opening in a pressure vessel, comprising a head having an associated gasket means adapted to sealingly seat against the peripheral edge of the opening on the inner end thereof, a stem centrally connected to said head and extended outwardly through said opening when said head and associated gasket means are seated against the opening, a binder adapted to seat against the peripheral edge of said opening on the outer side thereof, said binder having a central aperture through which said stem projects when said binder is in engagement with the outer end of the opening, a washer seated against said binder, said binder and washer having adjacent co-operating curvilinear surfaces to provide sealing adjustment of the head and binder in the event of seating irregularities, a nut threaded onto said stem to draw said head and associated gasket into sealing relationship with the inner peripheral edge of said opening, a plurality of Belleville springs stacked about said stem between said nut and washer to uniformly transmit and distribute to said head and gasket means an initial predetermined sealing force upon tightening of said nut whereby said Belleville springs compensate for deformation of said gasket means due to overstressing to insure maintenance of said initial sealing force on said gasket means upon the removal of working pressure acting on said head.

10. A fitting, for use as a closure for an opening in a pressure vessel, comprising a head having an associated gasket means adapted to sealingly seat against the peripheral edge of the opening on the inner end thereof, a stem centrally connected to said head and extended outwardly through said opening when said head and associated gasket means are seated against the opening, a binder adapted to seat against the peripheral edge of said opening on the outer side thereof, said binder having a central aperture through which said stem projects when said binder is in engagement with the outer end of the opening, a washer seated against said binder, said binder and washer having adjacent co-operating curvilinear surfaces to provide sealing adjustment of the head and binder in the event of seating irregularities, a nut threaded onto said stem to draw said head and associated gasket into sealing relationship with the inner peripheral edge of said opening, spring means disposed between said nut and washer to uniformly transmit and distribute to said head and gasket means an initial predetermined sealing force upon tightening of said nut, and a means to determine when said initial loading of the gasket means is reached whereby said spring means compensates for deformation of said gasket means due to overstressing to assure maintenance of said initial sealing force on said gasket means upon the removal of an applied pressure to said head.

11. A fitting, for use as a closure for an opening in a pressure vessel, comprising a head having an associated gasket means adapted to sealingly seat against the peripheral edge of the opening on the inner end thereof, a stem centrally connected to said head and extended outwardly through said opening when said head and associated gasket means are seated against the opening, a binder adapted to seat against the peripheral edge of said opening on the outer side thereof, said binder having a central aperture through which said stem projects when said binder is in engagement with the outer end of the opening, a washer seated against said binder, said binder and washer having adjacent co-operating curvilinear surfaces to provide sealing adjustment of the head and binder in the event of seating irregularities, a nut threaded onto said stem to draw said head and associated gasket into sealing relationship with the inner peripheral edge of said opening, a plurality of stacked conical springs disposed on said stem between said nut and washer to uniformly transmit and distribute to said head and gasket means an initial predetermined sealing force upon tightening of said nut, and whereby said springs compensate for deformation of said gasket means due to overstressing to assure maintenance of said initial sealing force on said gasket means upon the removal of an applied pressure to said head, and a stop means disposed on said stem, said stop means including a collar having a central portion engaging said spring stack and a laterally extending flange portion, a co-operating stop ring disposed on said stem in alignment with said flange, said ring and flange normally having a clearance therebetween so as to render said ring freely rotatable about said stem so that upon turning of the nut to apply the initial sealing force to said gasket said clearance is progressively diminished to wedge said stop ring between the spring stack and collar as the initial sealing pressure is approached.

12. A fitting, for closing an opening in a wall of a pressure vessel, comprising an inner and outer member disposed on opposite sides of the opening, said members being adapted to engage the peripheral edge portion of the opening on the inner and outer ends thereof to form a fluid-tight seal, a stem connected to one of said members, said stem extending through said opening and said other member, a nut threaded on said stem to draw said members into engagement with the peripheral edge portion of said opening, spring means disposed on said stem for maintaining an optimum initial sealing load imposed by tightening of said nut to draw said members, and stop means mounted on said stem to determine when said optimum sealing load on said members is reached.

13. A fitting, for closing an opening in a wall of a pressure vessel, comprising an inner means and outer means disposed on opposite sides of the opening, said inner means and outer means being adapted to engage the peripheral edge portion of the opening on the inner and outer ends thereof respectively to form a fluid-tight seal, a stem connected to one of said means, said stem extending through said opening and said other means, a nut threaded on said stem to draw said means into engagement with the peripheral edge portion of said opening, spring means disposed on said stem for maintaining a predetermined optimum initial sealing load imposed by tightening of said nut for drawing said means together, and a stop means mounted on said stem to determine when said optimum sealing load on said inner and outer means is reached.

References Cited in the file of this patent

UNITED STATES PATENTS

| | | |
|---|---|---|
| 1,438,172 | Elbert | Dec. 12, 1922 |
| 2,374,403 | Yarnall | Apr. 24, 1945 |
| 2,705,574 | Schoessow | Apr. 5, 1955 |